United States Patent [19]

Shimada et al.

[11] 4,340,186
[45] Jul. 20, 1982

[54] FLYER-TYPE COIL WINDING MACHINE

[75] Inventors: Sachio Shimada; Yoshiaki Ohwada, both of Yokohama, Japan

[73] Assignee: Sony Corporation, Tokyo, Japan

[21] Appl. No.: 96,480

[22] Filed: Nov. 21, 1979

[30] Foreign Application Priority Data

Nov. 30, 1978 [JP] Japan .............................. 53/148420

[51] Int. Cl.³ ........................................ H02K 15/09
[52] U.S. Cl. .............................. 242/7.05 B; 140/92.1; 242/7.14
[58] Field of Search ................. 242/7.05 B, 7.09, 7.14, 242/101 A, 4 B; 29/605, 596, 597; 140/92.1

[56] References Cited

U.S. PATENT DOCUMENTS

| | | | |
|---|---|---|---|
| 3,643,326 | 2/1972 | Boke | 29/605 |
| 3,713,598 | 1/1973 | Bucholtz et al. | 242/7.05 B |
| 3,812,577 | 5/1974 | Compton et al. | 29/597 |
| 3,995,785 | 12/1976 | Arick | 140/92.1 X |
| 4,052,783 | 10/1977 | Shively | 29/597 |
| 4,262,853 | 4/1981 | Dammar | 242/7.05 B |

Primary Examiner—Billy S. Taylor
Attorney, Agent, or Firm—Lewis H. Eslinger; Alvin Sinderbrand

[57] ABSTRACT

A flyer-type winding machine includes a forming apparatus which is linearly reciprocated with respect to an axis of a bobbin, coil form or core on which a filament is to be wound while the filament is paid out from a flyer which rotates or orbits thereabout. The forming apparatus guides the filament to the bobbin, coil form or core. Moveable pins are synchronized with orbiting of the flyer to cooperate with the forming apparatus in intermittently catching and releasing the filament so as to control the positions at which portions of each turn of the filament are laid down on the bobbin, coil form or core.

11 Claims, 22 Drawing Figures

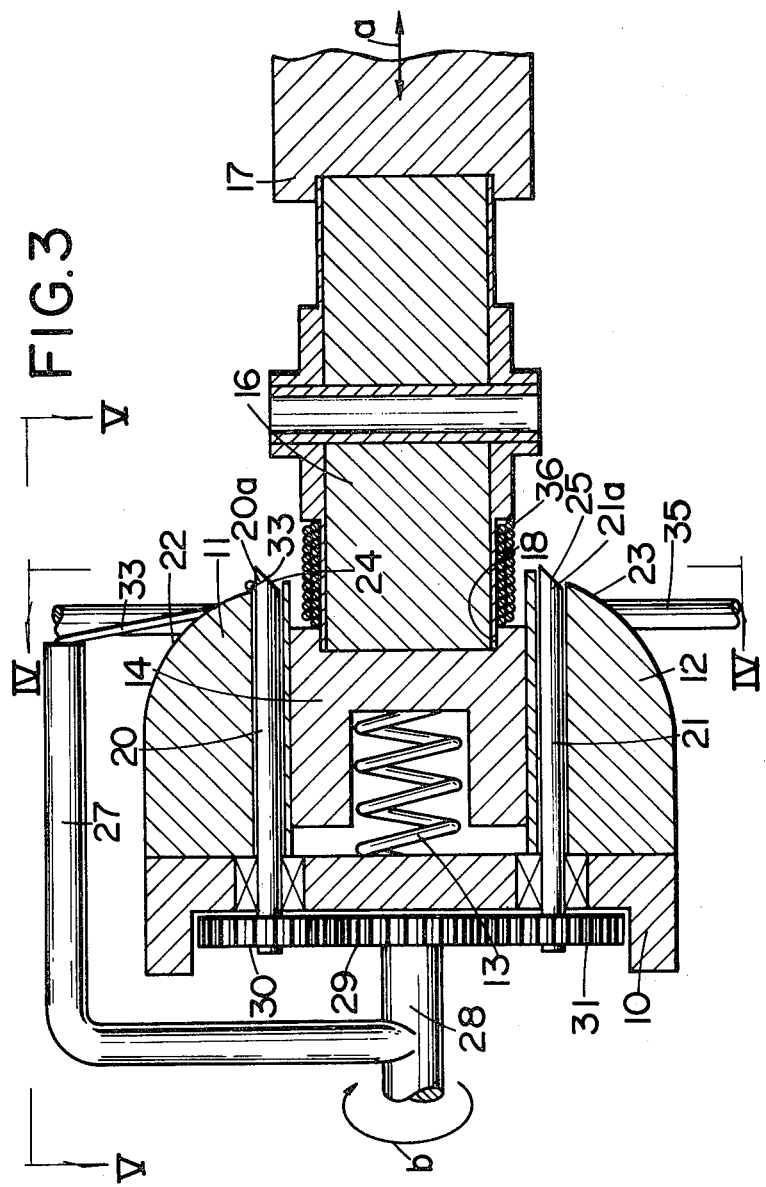

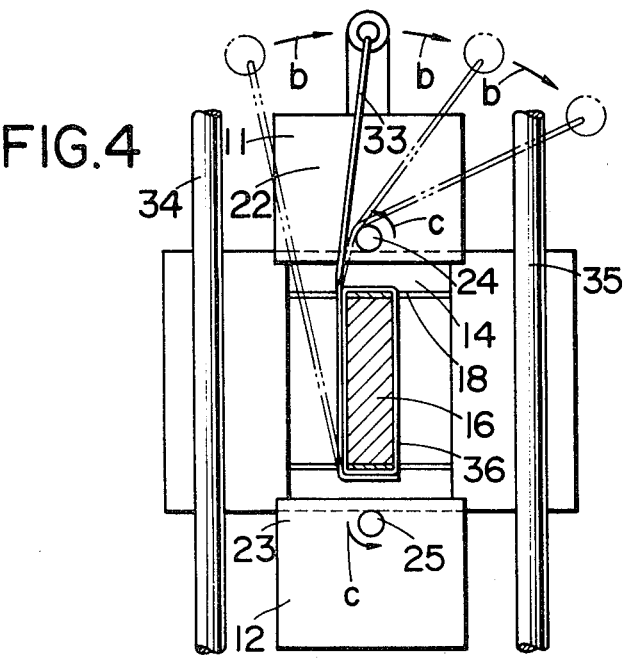
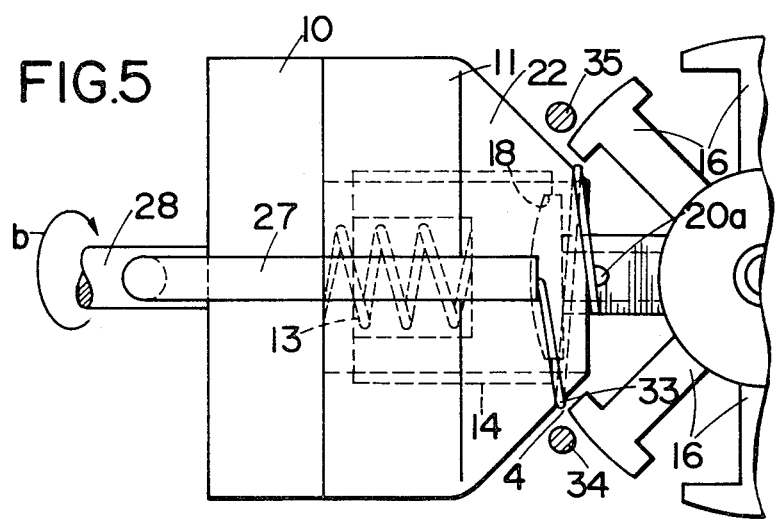

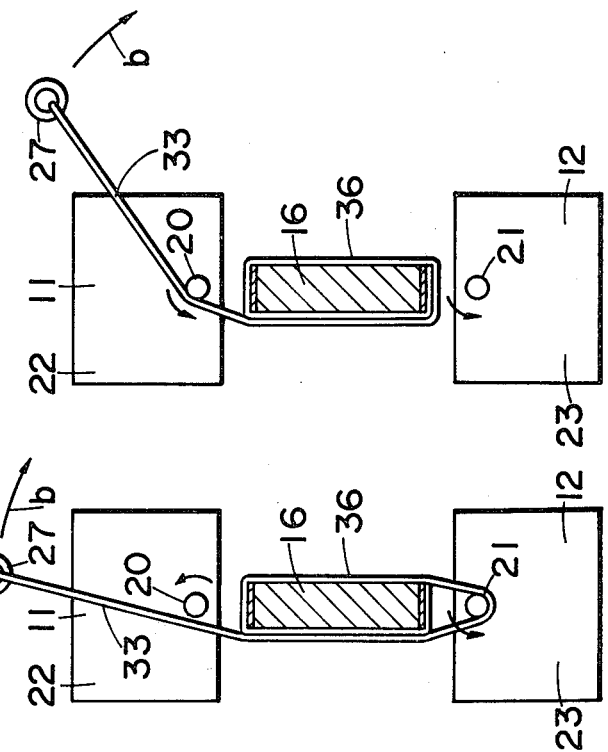

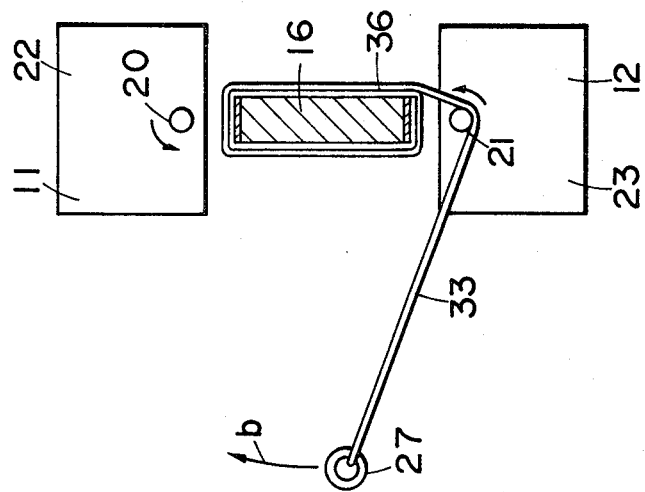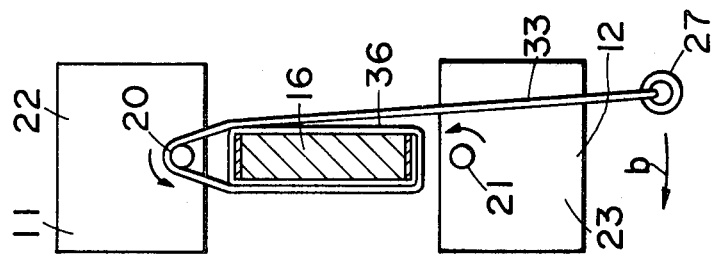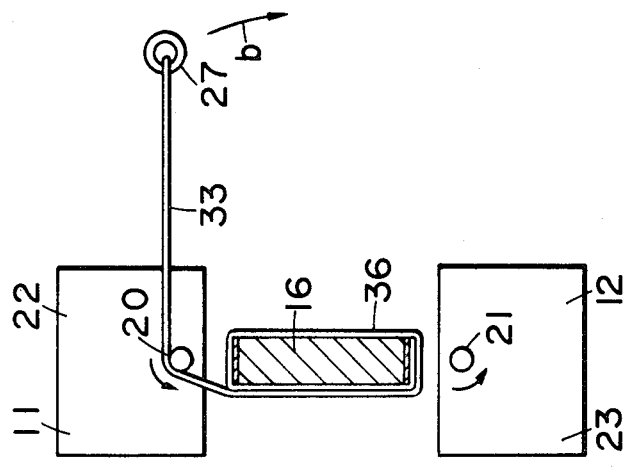

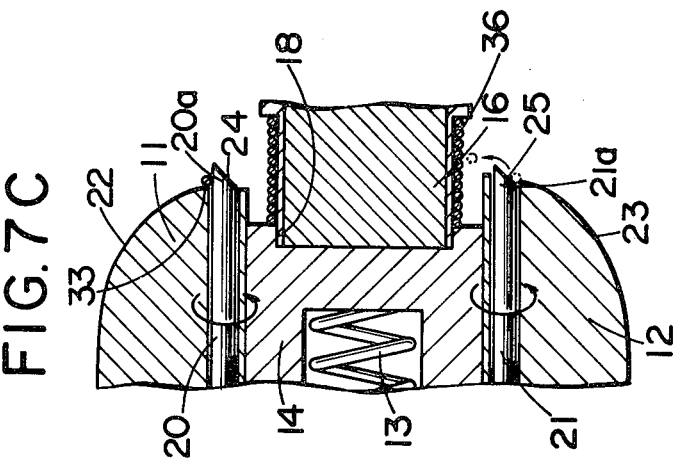
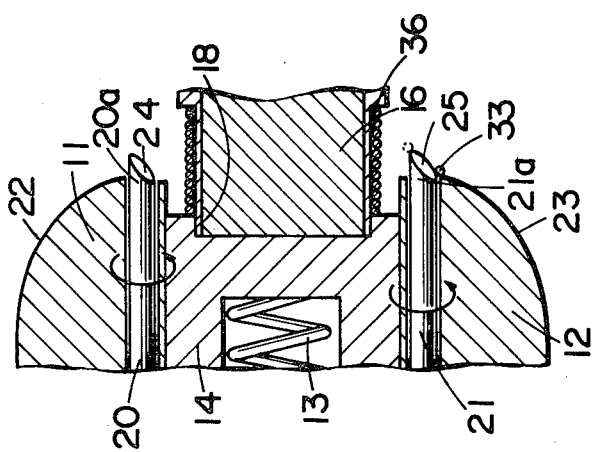
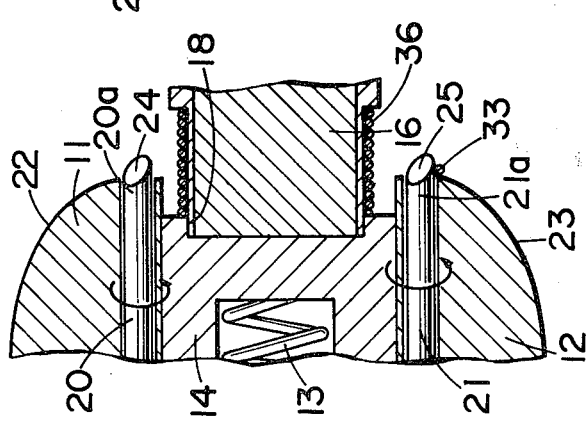

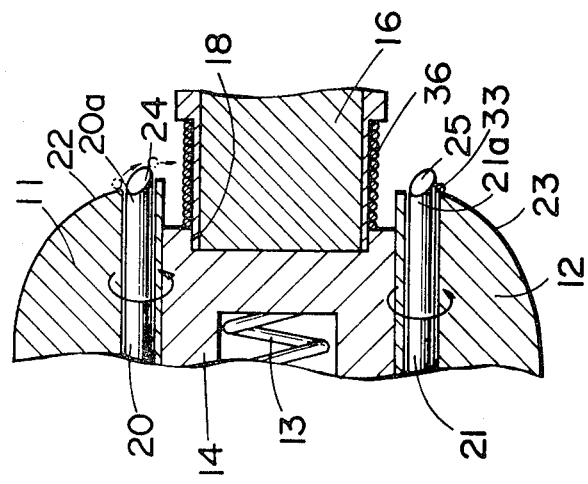
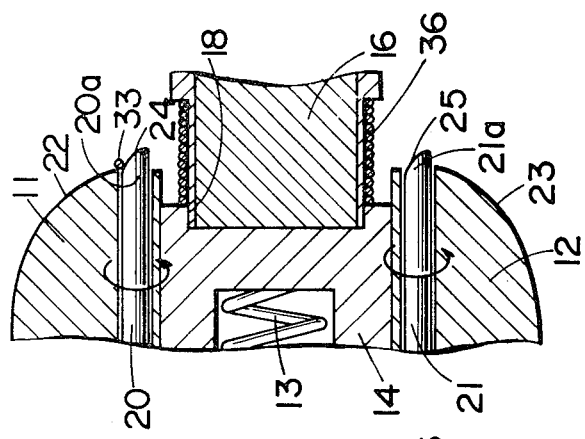
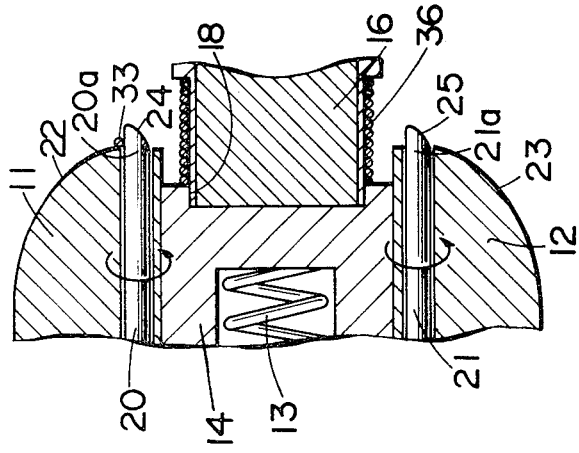

4,340,186

FLYER-TYPE COIL WINDING MACHINE

BACKGROUND OF THE INVENTION

This invention relates to a flyer-type winding machine by which various kinds of filament materials such as conductive or non-conductive string, cord, wire or thread can be automatically wound on a bobbin or coil form. More particularly, the invention is related to a flyer-type winding machine in which a wire-like material turned by a flyer, is guided by a former onto a bobbin or coil form on which it is to be wound.

Flyer-type winding machines, in which a wire is guided by a former onto a bobbin or coil form, are useful where the space for winding is very small. For example, flyer-type winding machines are widely used for winding coils on the cores of poles of the rotors of electric motors.

A flyer-type winding machine has a forming apparatus which is either stationary or reciprocated with respect to an axis of the bobbin or coil form. When the forming apparatus is stationary, the filament being wound on the bobbin or coil form tends to cross itself and the turns thereof pile up in a scrambled fashion to result in a winding having a poor space factor, that is, a relatively low ratio of the number of its turns to the space occupied thereby. Even when the forming apparatus and bobbin or coil form are relatively reciprocated during winding, a tendency still exists, due to an oblique force on the filament as it passes from the forming apparatus to the winding, for the turns of filament to pile up either at the ends or the center of the winding and to thus also produce a poor space factor.

OBJECTS AND SUMMARY OF THE INVENTION

Accordingly, it is an object of the invention to provide a flyer-type winding machine which overcomes the defects of a conventional flyer-type winding machine.

Another object of this invention is to provide a flyer-type winding machine which controls the position of a wire being wound with sufficient accuracy to produce a winding having an improved space factor.

According to an aspect of the invention, there is provided a winding machine for winding a filament into a coil comprising first means mounted for orbiting about an axis of the coil for paying out the filament, at least one forming member for guiding the filament from the first means to the coil, and second means associated with the at least one forming member and being synchronized with the first means for catching the filament during a first substantial portion of each orbit of the first means whereby the filament is held from the coil and for releasing the filament during a second substantial portion of each orbit of the first means whereby the filament is pulled onto the coil.

According to a feature of the invention, a winding machine for winding wire on a coil comprises a flyer mounted for orbiting about an axis of the coil for paying out the wire, first and second opposed forming members having sloping surfaces operative to at least partially surround the coil and to guide the wire along the sloping surfaces from the flyer to the coil, a first pin associated with the first forming member, a second pin associated with the second forming member, first means for causing engagement of the first pin with the wire during a first portion of each orbit of the flyer and for disengaging the wire at the end of the first portion, and second means alternately operable with the first means for causing engagement of the second pin with the wire during a second portion of a rotation of the flyer and for disengaging the wire at the end of the second portion.

The above, and other objects, features and advantages of the present invention, will become apparent from the following description read in conjunction with the accompanying drawings in which like reference numerals designate the same elements.

BRIEF DESCRIPTION OF THE DRAWINGS

FIG. 3 is a longitudinal cross-sectional view of a flyer-type winding machine according to a first embodiment of the present invention;

FIG. 4 is a front cross-sectional view of the flyer-type winding machine taken along the line IV—IV in FIG. 3;

FIG. 5 is a plan view of the flyer-type winding machine as viewed in the direction of the arrows V—V in FIG. 3;

FIGS. 6A-6F are schematic cross-sectional views similar to FIG. 4 from which unessential elements have been omitted, and to which reference will be made in explaining the operation of the winding machine of FIGS. 3-5;

FIGS. 7A-7F are longitudinal cross-sectional views similar to FIG. 3 and respectively corresponding to the views in FIGS. 6A-6F;

DETAILED DESCRIPTION OF THE PREFERED EMBODIMENTS

Figure 1:
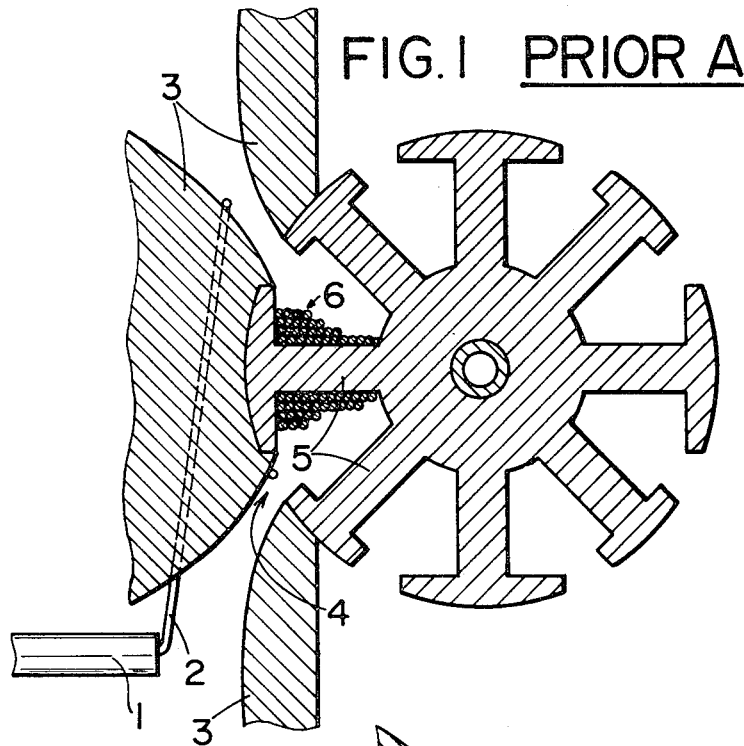
FIG. 1 is a longitudinal cross-sectional view of a conventional flyer-type winding machine.

Referring now to FIG. 1, there is shown a flyer-type winding machine according to the prior art in which a filament or wire 2 is wound on a bobbin, coil form or core 5 of the pole of a rotor of an electric motor. Wire 2 is paid out by a rotating or orbiting flyer 1 about a fixed former 3. The wire follows the sloping contour of former 3 onto core 5 through a slit 4 between former 3 and adjacent cores 5 to form a coil 6. As wire 2 slides from former 3 onto core 5, wire 2 often crosses itself, and is thus wound in a disordered or scrambled fashion on core 5. Such disordered winding provides a poor space factor in coil 6.

Figure 2:
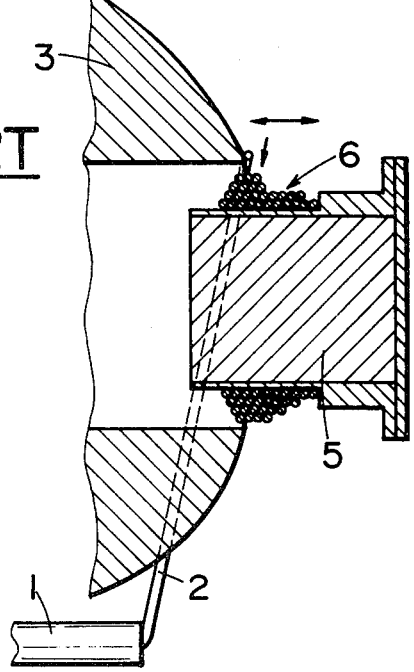
FIG. 2 is a longitudinal cross-sectional view of another conventional flyer-type winding machine.

Referring now to FIG. 2, it will be seen that, during winding of coil 6, either former 3 or core 5 may be reciprocated relative to the other thereof in the axial direction of core 5, as indicated by the double-headed arrow. Since the position of former 3 shifts during winding relative to flyer 1, even though former 3 and core 5 are relatively reciprocated during winding, wire 2 does not drop vertically from former 3 onto core 5. Instead, as shown by the oblique arrow in FIG. 2, wire 2 tends to approach core 5 from former 3 at an oblique angle. As a result, the thickness of coil 6 may be larger toward the center or the ends of core 5. Such piling up of windings provides a poor space factor for coil 6. In addition, wire 2 may become crossed on core 5 to form a disordered winding as in the preceding case and thus further interfere with a good space factor.

Referring now to FIGS. 3-5, it will be seen that, in the embodiment of the invention there illustrated, a pair of opposed forming members 11 and 12 are fixed to a support 10. A former block 14 between forming members 11 and 12 is slidable in the direction shown by the arrow a, and is urged rightward (FIG. 3) by a spring 13. A bobbin or coil form, which may be a core 16 of one of the poles of a motor, is held by a holder 17. Holder 17 is reciprocated in the direction shown by the arrow a to provide relative motion between fixed forming members 11 and 12 and core 16. An outer end of core 16 is fitted into a groove 18 in former block 14. Former block 14 and core 16 are firmly pressed together by the urging of spring 13. Former block 14 is thus reciprocated together with core 16 in the direction shown by the arrow a. Forming members 11 and 12 have curved surfaces 22 and 23 which are tapering or inclined toward each other at the outer ends thereof to guide a wire 33 paid out from a flyer 27 toward core 16.

First and second pins 20 and 21 are rotatably arranged in forming members 11 and 12 parallel to the direction a. Oblique surfaces 24 and 25, formed on the outer ends 20a, and 21a of pins 20 and 21, are inclined relative to the axes of pins 20 and 21 by angles substantially equal to the angles relative to such axes of the curved surfaces 22 and 23 at the points where pins 20 and 21 protrude therethrough (see particularly oblique surface 25 of pin 21 relative to curved surface 23 in FIG. 3). Flyer 27 is mounted on a drive shaft 28 which is turned in the direction of the arrows b (FIGS. 3 and 4) so as to cause flyer 27 to orbit about forming members 11 and 12. A gear 29, is fixed on drive shaft 28, and engages gears 30 and 31 fixed on the inner ends of pins 20 and 21. The gears 29, 30 and 31 have a ratio of 1:1:1 whereby pins 20 and 21 rotate one revolution in the direction indicated by arrows c (FIG. 4) per turn of flyer 27 in the opposite direction indicated by arrows b. Oblique end surfaces 24 and 25 of pins 20 and 21 are in the same rotational phase, as shown in FIG. 3, whereby both end surfaces always face in the same direction (for example, both oblique end surfaces face down in FIG. 3).

First and second guide posts 34 and 35 are disposed parallel to the long axis of the rectangular cross-section of core 16. Guide posts 34 and 35 help guide wire 33 through slit 4 between adjacent cores 16. Guide posts 34 and 35 may be laterally adjustable (by conventional means not shown) to adapt the apparatus for winding motors having different numbers and sizes of cores.

While core 16 is reciprocated in the direction of arrow a, and flyer 27 is turned in the direction of arrows b by drive shaft 28, wire 33 is wound on core 16 to form a coil 36.

The winding sequence of coil 36 is described below with reference to FIGS. 6A-6F and 7A-7F.

When flyer 27 is located generally below the long axis of the cross-section of core 16 (FIGS. 6E and 7E), pins 20 and 21 are in rotational positions opposite from that shown in FIG. 3. Thus, oblique end surface 25 on outer end 21a of pin 21 is rotated to a position in which outer end 21a protrudes from forming member 12, and oblique end surface 24 on outer end 20a of pin 20 is rotated to a position which is substantially aligned and flush with curved surface 22 on forming member 11. Wire 33 catches an outer end 21a of pin 21 (FIGS. 6F and 7F) as flyer 27 moves past the position vertically below pin 21. As flyer 27 continues its rotation to the position shown on FIG. 6A, wire 33 is guided by guide post 34 and forming member 12 through gap 4 (FIG. 5). With additional rotation of flyer 27 to the position shown on FIG. 6B, pins 20 and 21 are rotated to the positions shown on FIG. 7B in which oblique end surface 25 is almost aligned with the local inclination of curved surface 23 on forming member 12. As shown on FIGS. 6C and 7C, wire 33 slides over oblique end surface 25 and is pulled smoothly against core 16 by further rotation of flyer 27 or by tension in wire 33 to form a half turn of coil 36. As also seen on FIG. 7C, oblique end surface 24 on outer end 20a of pin 20 is rotated to be out of alignment with the local inclination of curved surface 22 on forming member 11 at this time so that wire 33 is caught on pin 20 as flyer 27 passes above it. Wire 33 remains caught on pin 20 during the downward travel of flyer 27 as shown in FIGS. 6C, 7C, 6D, 7D, 6E and 7E. The shape and angular position of oblique end surface 25 can permit wire 33 to slide thereover either before or after flyer 27 is rotated sufficiently to bring wire 33 into contact with pin 20. During downward travel of flyer 27, wire 33 is guided through slit 4 by guide post 35 and forming member 11.

Just after the condition shown on FIGS. 6E and 7E, oblique end surface 24 on outer end 20a of pin 20 is rotated into substantial alignment with the local inclination of curved surface 22 on forming member 11. Wire 33 slides over end surface 24 onto coil form 16 to form another half turn of coil 36. As the half turns of wire 33 are laid down on core 16 under alternate control of pins 20 and 21, core 16 and forming members 11 and 12 are relatively axially reciprocated to place each succeeding half turn in a properly ordered and spaced position with respect to the corresponding part of the preceding turn. This process continues to lay down precisely spaced and ordered turns in one or more layers on core 16 until the winding of coil 36 is completed.

Figure 8:
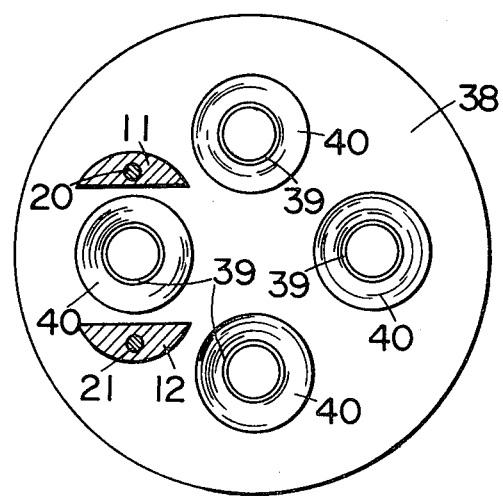
FIG. 8 is a cross-sectional front view taken along the line VIII—VIII in FIG. 9, and diagrammatically illustrating the use of the machine of FIGS. 3-5 for winding coils of a brushless DC motor.
Figure 9:
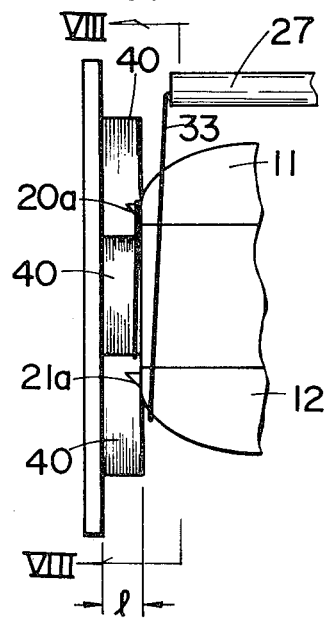
FIG. 9 is a side view corresponding to FIG. 8.

The above-described flyer-type winding machine may also be used to wind round coils of, for example, a flat brushless DC motor such as shown in FIGS. 8 and 9. Four bobbins 39 are mounted in opposed pairs on a mounting plate 38. Coils 40, having a predetermined coil length l, are wound on bobbins 39. In the winding operation, diametrically opposed pairs of coils 40 may be serially wound using a continuous wire. This eliminates the need for terminals for interconnecting the pairs of coils 40 after winding.

Figure 10:
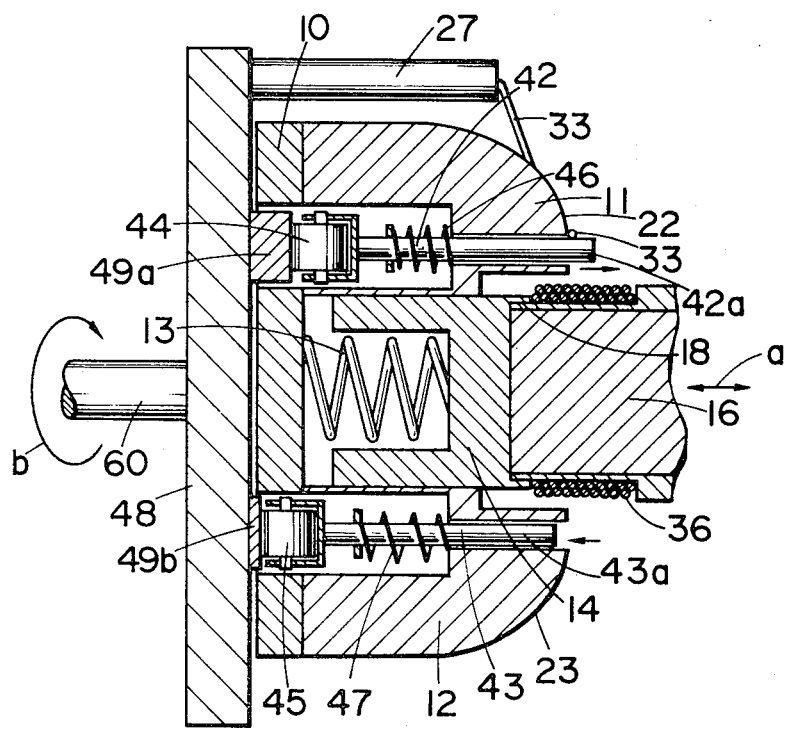
FIG. 10 is a longitudinal cross-sectional view of a flyer-type winding machine according to another embodiment of this invention.
Figure 11:
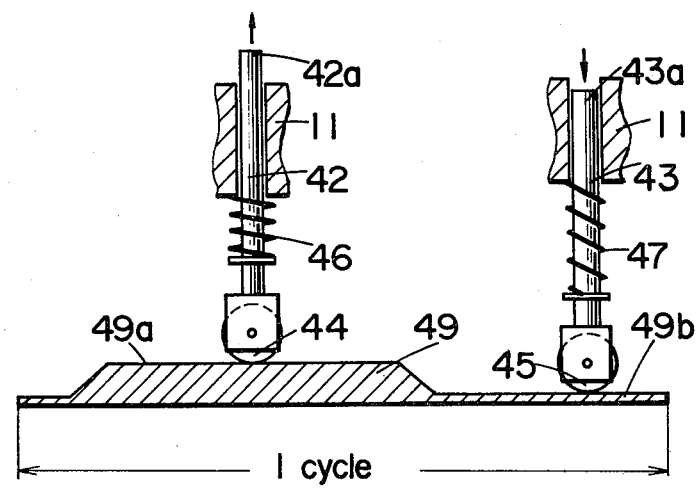
FIG. 11 is a developed view of a circular cam and related rollers or cam followers of the flyer-type winding machine of FIG. 10.

Referring now to FIGS. 10 and 11, an embodiment of the invention is there shown to employ a pair of longitudinally slidable pins 42 and 43 in place of the rotatable pins 20 and 21 of the previous embodiment. Outer ends 42a and 43a of pins 42 and 43 are alternately projected from, and retracted into the outer ends of forming members 11 and 12. Cam-actuated rollers or cam followers 44 and 45 are rotatably supported on the inner ends of pins 42 and 43. Rollers 44 and 45 and the respective pins 42 and 43 are urged leftward in FIG. 10 by springs 46 and 47, respectively. Flyer 27 is fixed to a rotary disc 48 which is rotated by a drive shaft 60. An annular cam 49 on rotary disc 48 controls reciprocation of rollers 44 and 45 and pins 42 and 43. A higher portion 49a and a lower portion 49b contiguous with each other on annular cam 49 each cover an angle of about 180 degrees. When rotary disc 48 and flyer 27 are rotated by drive shaft 60, rotary cam 49 is also rotated therewith. Alternately, one of the rollers 44 and 45 of pins 42 and 43 rides on higher portion 49a of cam 49 and the other rides on lower portion 49b. The outer end 42a or 43a of pin 42 or 43 associated with the roller riding on higher portion 49a is forced outward against the urging of spring 46 or 47 to protrude beyond the outer end of forming member 11 or 12. The outer end 42a or 43a of the other of pins 42 and 43 is retracted into the outer end of forming member 11 or 12. As annular cam 49 is rotated, outer ends 42a and 43a of pins 42 and 43 alternately protrude from and are retracted into the outer ends of forming members 11 and 12. Thus, the outer ends 42a and 43a of pins 42 and 43 act similarly to the oblique end surfaces 24 and 25 of pins 20 and 21 in the first described embodiment to ensure the smooth development of coil 36.

Figure 12:
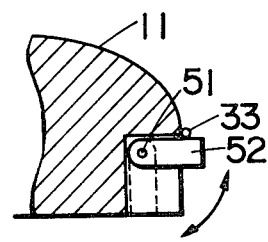
FIG. 12 is a fragmentary longitudinal cross-sectional view of a part of a flyer-type winding machine according to still another embodiment of this invention.

Referring now to FIG. 12, there is shown another embodiment of this invention in which a pin 52 is pivotable on a pivot 51 to swing in the directions shown by the curved arrow, in synchronization with rotation of flyer 27 (not shown in FIG. 12). When pin 52 protrudes from the outer end of forming member 11 as shown in the solid lines, wire 33 may be caught by pin 52. When pin 52 is pivoted to be received in the outer end of forming member 11, as shown by the dashed line in FIG. 12, wire 33 is disengaged from pin 52 and falls onto the coil (not shown). It will be appreciated that, in the case of the embodiment of FIG. 12 which only shows the forming member 11, the other forming member similar to the member 12 on FIG. 10, would also be provided with a pivoted pin similar to the pin 52 of FIG. 12, and that a suitable mechanism (not shown) would be provided to effect the alternate swinging movements of the pivoted pins in synchronism with the orbiting of the flyer.

Having described specific preferred embodiments of the invention with reference to the accompanying drawings, it is to be understood that the invention is not limited to those precise embodiments, and that various changes and modifications may be effected therein by one skilled in the art, for example, as to the shape or construction of the movable protrusions or pins provided on the forming members or as to the mechanism for actuating the same, without departing from the scope or spirit of the invention as defined in the appended claims.

What is claimed is:

1. A winding machine for winding a filament into a coil comprising:
    flyer means orbiting about an axis of said coil for paying out said filament;
    at least one forming member having a guide surface for guiding said filament from said flyer means to said coil;
    catching means associated with said at least one forming member and being movable in respect to the latter between a retracted position and a projecting position in respect to said guide surface; and
    actuating means for said catching means synchronized with the orbiting of said flyer means to dispose said catching means in said projecting position for catching said filament during a first substantial portion of each orbit of said flyer means and to dispose said catching means in said retracted position for releasing said filament to slide along said guide surface during a second substantial portion of each said orbit of said flyer means.

2. A winding machine according to claim 1; wherein said guide surface has a first slanted surface portion, said catching means includes at least one pin having a slanted end portion substantially matching the inclination of said slanted surface portion, and said actuating means includes means for rotating said at least one pin from a first angular position corresponding to said retracted position and wherein said slanted end portion is aligned with said slanted surface portion to a second angular position corresponding to said projecting position and wherein said slanted end portion is misaligned and protrudes from said slanted surface portion, the end portion of said at least one pin being operative to hold said filament in said second angular position and to release said filament in said first angular position.

3. A winding machine according to claim 2; wherein said means for rotating includes a first gear rotatable with said orbiting of said flyer means, and at least a second gear meshed with said first gear and being attached to said at least one pin.

4. A winding machine according to claim 1; wherein said catching means includes at least one pin slidable in said at least one forming member, and said actuating member includes means for displacing said at least one pin along an axis thereof beyond said guide surface of said at least one forming member.

5. A winding machine according to claim 4; wherein said means for displacing includes an annular cam rotatable with said orbiting of said flyer means, variable height portions on said annular cam, and means associated with said at least one pin sequentially contacting said variable height portions in response to rotation of said annular cam.

6. A winding machine for winding wire on a coil comprising:
    a flyer orbiting about an axis of said coil for paying out said wire;
    first and second opposed forming members having sloping surfaces operative to at least partially surround said coil and to guide said wire along said sloping surfaces from said flyer to said coil;
    a first pin in said first forming member;
    a second pin in said second forming member;
    first means for engaging said first pin with said wire during a first portion of an orbit of said flyer and for disengaging said wire at the end of said first portion; and
    second means for engaging said second pin with said wire during a second portion of said orbit of said flyer and for disengaging said wire at the end of said second portion.

7. A winding machine according to claim 6; further comprising at least one guide post for guiding said filament from said flyer to at least one of said forming members during at least part of said orbit of said flyer.

8. A winding machine according to claim 1; further comprising another forming member which is diametrically opposed to said one forming member relative to said axis and which also has a guide surface for guiding said filament from said flyer means to said coil; and in which said catching means includes first and second pins associated with said one forming member and said other forming member, respectively, and each having an operative end which extends beyond, and is withdrawn below said guide surface of the respective forming member in said projecting and retracted positions, respectively, and said actuating means includes means by which said first and second pins are alternately moved to said projecting and retracted positions during said first and second portions of said orbit and during said second and first portions of said orbit, respectively.

9. A winding machine according to claim 6; in which each of said pins has a slanted end portion substantially matching the inclination of said sloping surface of the respective one of said forming members, and each of said pins is rotatable about its longitudinal axis between a first position in which said slanted end portion is aligned with said sloping surface of the respective forming member for disengaging the wire and a second position in which said slanted end portion is misaligned in respect to said sloping surface of the respective forming member and projects therefrom for engaging the wire.

10. A winding machine according to claim 9; in which said first and second means include gears attached to said pins for rotating the latter about the respective longitudinal axes, and a gear rotatable with the orbiting flyer and meshing with said gears attached to the pins for rotating the latter in synchronism with the orbiting movement of said flyer.

11. A winding machine according to claim 6; in which said pins are axially slidable in respect to the respective forming members; and said first and second means include an annular cam rotatable in response to said orbiting by said flyer and having variable height portions, and cam followers associated with said pins and engaging said annular cam to effect longitudinal displacements of said pins between projecting and retracted positions in response to engagement with said variable height portions as the cam rotates.

* * * * *